(12) United States Patent
Hakemeyer et al.

(10) Patent No.: US 8,958,365 B2
(45) Date of Patent: Feb. 17, 2015

(54) WIRELESS NETWORK

(75) Inventors: Frank Hakemeyer, Horn-Bad Meinberg (DE); Daniel Klein, Blomberg (DE); Andreas Senger, Altenbeken (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 13/394,251

(22) PCT Filed: Sep. 17, 2010

(86) PCT No.: PCT/EP2010/063740
§ 371 (c)(1),
(2), (4) Date: Jun. 21, 2012

(87) PCT Pub. No.: WO2011/033088
PCT Pub. Date: Mar. 24, 2011

(65) Prior Publication Data
US 2012/0263105 A1  Oct. 18, 2012

(30) Foreign Application Priority Data

Sep. 18, 2009  (DE) .......................... 10 2009 041 836

(51) Int. Cl.
*H04W 4/00*   (2009.01)
*H04W 40/32*  (2009.01)
*H04L 12/761* (2013.01)

(52) U.S. Cl.
CPC .............. *H04W 40/32* (2013.01); *H04L 45/16* (2013.01)
USPC ........................................................ 370/328

(58) Field of Classification Search
None
See application file for complete search history.

(56) References Cited

U.S. PATENT DOCUMENTS

| 4,079,188 | A | * | 3/1978 | Kinch et al. | .................. 380/259 |
| 2003/0223377 | A1 | * | 12/2003 | Simmons et al. | ............. 370/254 |
| 2005/0180447 | A1 | * | 8/2005 | Lim et al. | ...................... 370/432 |
| 2009/0017843 | A1 | | 1/2009 | Laroia et al. | |

FOREIGN PATENT DOCUMENTS

| CN | 101052055 A | 10/2007 |
| EP | 1 840 684 | 10/2007 |
| WO | 2009056511 A1 | 5/2009 |

OTHER PUBLICATIONS

English Language Abstract of EP 1840684 published on Oct. 3, 2007.
Telemetrie/Fernwirk-Funksystem, www.we-em.de, published Mar. 2001.
Office Action in Chinese counterpart application No. 201080041559.9, dated Jul. 24, 2014 (6 pages).

* cited by examiner

*Primary Examiner* — Chirag Shah
*Assistant Examiner* — Suk Jin Kang
(74) *Attorney, Agent, or Firm* — DLA Piper LLP (US)

(57) ABSTRACT

The invention relates to a radio network comprising a plurality of first clients which can communicate with one another by means of radio waves, wherein the first clients have at least one input unit for the input of data and/or at least one output unit for the output of data, wherein a first reference can be adjusted on one input unit and a second reference can be adjusted on one output unit, wherein the radio network is configured such that the incoming data to the input unit is communicated to the one or more output units the second reference thereof corresponding with the first reference adjusted on the input unit.

17 Claims, 3 Drawing Sheets

WIRELESS NETWORK

CROSS-REFERENCE TO RELATED APPLICATION(S) INFORMATION

This application is a National Stage of International Application No. PCT/EP2010/063740 (not published in English), filed Sep. 17, 2010, which, in turn, claims the benefit of German Patent Application No. 10 2009 041 836.9, filed Sep. 18, 2009, which are incorporated herein by reference in entirety.

BACKGROUND

The invention relates to a wireless network that includes multiple Clients, which can communicate using radio waves.

Networks that have several Clients that can communicate with each other are generally well-known. The Clients can be arranged within the network into different logical structures, whereby the Clients can be arranged in the form of a tree structure. In a tree structure where a Client is at the top, the other Clients can attach to this Client. The Client that is at the top of the tree structure is a part of an upper, first network level, where Clients that are directly connected with that Client belong to a second network level subordinate to the first network level, and where subsequent Clients that are directly connected to the latter Clients are part of a third network level subordinate to the second network level, and so on. In a tree structure, only connections between Clients at adjacent network levels are allowed. Connections within a network level are prohibited. Furthermore, a Client, with the exception of Clients at the top of the tree structure, is connected with only one Client in an adjacent higher network level. In addition, several Clients in a subordinate network level may be connected to an adjacent higher network level through a single Client.

The Clients of a network are also referred to as "network nodes" or "nodes". Furthermore, a distinction is made, depending on the function of the Client, between Master-Clients, Repeater-Slave-Clients and Slave-Clients. The Master-Client is the central point of the network. Initialization and network-specific functions are performed by the Master-Client. Without a Master-Client, the network is not functional. In a tree structure, the Client at the top is a Master-Client. A Repeater-Slave-Client has the function of forwarding messages between neighboring Clients. A Slave-Client does not forward any messages. Slave-Clients are always endpoints of the network.

Wireless networks that have a supervisory control, which collects data from individual Clients in the wireless network and distributes data to Clients on the wireless network, are well-known. Such a higher-level control could be, for example, an SPS (Storage Programmable Control)-control, which is connected to a Master-Client of the wireless network, for example, via a data interface. In particular, the exchange of data, in which a Client makes the wireless network available and in which the other Clients require the wireless network, occurs via this supervisory control.

Such a structure of a wireless network requires the user to create a special controller program, which performs the operation of collecting and distributing data. Since there are different controls with different programming environments, for example, KOP, FPS, FUP, AWL, or even controls based on higher-level languages, such as C or C++, it is often difficult as well as costly for the user to implement a data exchange between the Clients of the wireless network.

SUMMARY

The object of the invention is to create a wireless network that provides a user with a simple way in which to exchange data between Clients of the wireless network.

This objective can be achieved via a wireless network according to the disclosure herein. The benefits of the invention are set forth in the attached claims.

BRIEF DESCRIPTION OF DRAWINGS

The invention and its embodiment will be explained in greater detail along with accompanying drawings, wherein.

DETAILED DESCRIPTION

Figure 1:
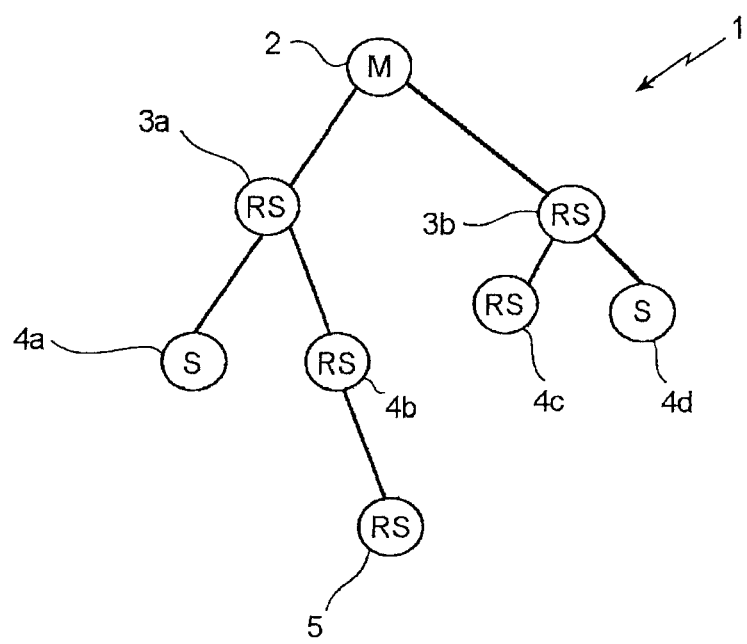
FIG. 1 illustrates a schematic representation of the embodiment of the invented wireless network.

The invented wireless network includes several first Clients that can communicate with each other using radio waves, wherein the first Clients have at least one input unit for entry of data and/or at least one output unit for output of data, and a first reference is set to an input unit, and a second reference is set to an output unit, wherein the wireless network is arranged such that the incoming data is communicated to the input unit by one or several output units, and where the second reference is matched to the first reference set to the input unit.

Where the exchange of data between the input units and output units can be controlled by the first Client, a master controller is not needed. It can be established solely by setting the first reference to an input unit and by setting the second reference to an output unit, in which the output unit or output units communicate incoming data to an input unit. The "programming" of such a data exchange is easily possible for a user. In particular, the user does not have to master any programming languages. Furthermore, the fact that a higher-level control is not needed, allows the wireless network to be built with a reduced number of components.

An input unit is a unit wherein data can be entered in the wireless network, for example, test signals from sensors connected to the input unit, control signals switches connected to the input unit or other input data. An output unit is a unit wherein data can be emitted from the wireless network, for example, to actuators connected to an output unit, or signals or other equipment that uses such output data.

The first reference and the second reference can be executed as reference numbers in particular. Alternatively, the first reference and/or the second reference can, for example, be composed of letters, letter sequences, or symbols. It is preferred that the first reference and the second reference be manually adjustable.

The fact that "first" Clients are in a wireless network does not necessarily mandate that there should be "second" Clients in it as well. The wireless network can consist of only the first Client.

One benefit is where on the wireless network with a second Client, the wireless network is set up so that data received on an input unit of a first Client is communicated to the second Client, and data from an input unit, which is assigned to one or more output units by a matching first reference and second reference, is communicated by the first Client to the singly assigned or multiply assigned output units.

The data exchange between input units and output units takes place this way indirectly via the second Clients. This allows data exchange between the input units and output units to be controlled by the second Client. Preferably, the wireless network is set up such that the second Client collects the data received by the input unit, and communicates data from the input units of the second Client to the first Clients' output unit or output units associated with the data only when the data is needed and/or requested by the first Clients. The latter prevents unnecessary data transfer and reduces network traffic.

The second Client itself may be comprised of one or more input and/or output units.

The second Client is preferably a Master-Client.

A benefit is that the wireless network is structured as a tree structure. Where there is a second Client that is particularly set up as a Master-Client, it is preferred that the second Client be the top of the tree structure.

The invention and its embodiment will be explained in greater detail along with accompanying drawings.

Figure 2:
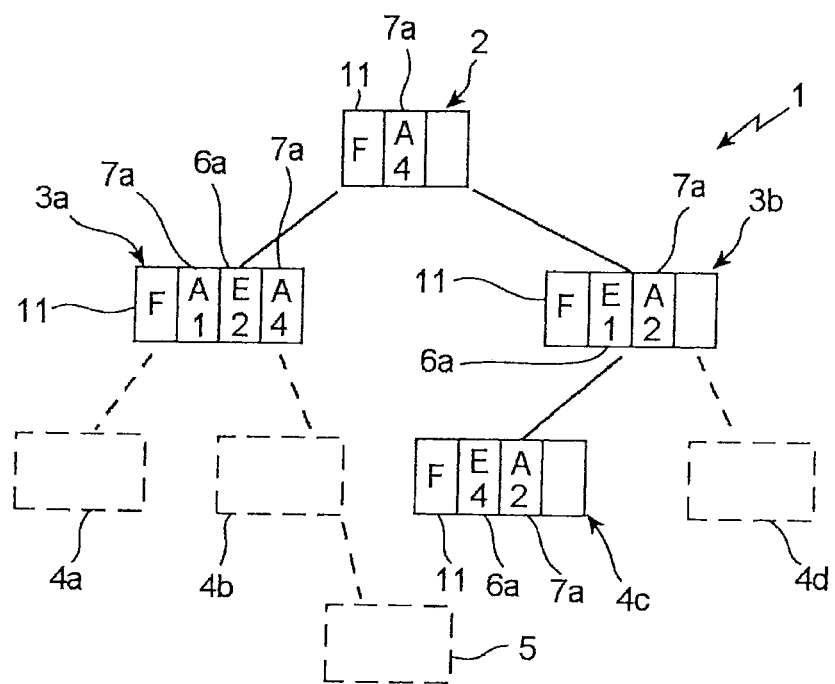
FIG. 2 illustrates the wireless network shown in FIG. 1 with an exemplary assignment of different input units to output units of the various Clients of the wireless network.
Figure 3:
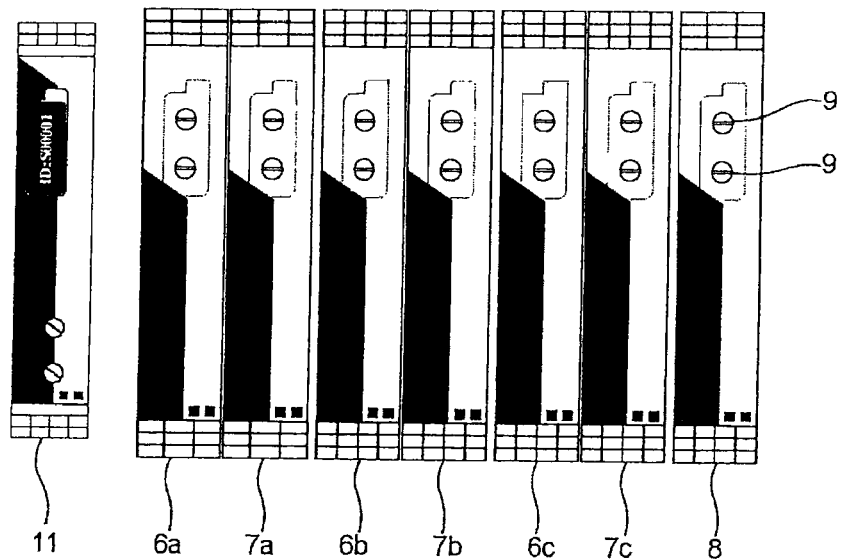
FIG. 3 illustrates a first embodiment of a first Client of the wireless network.
Figure 4:
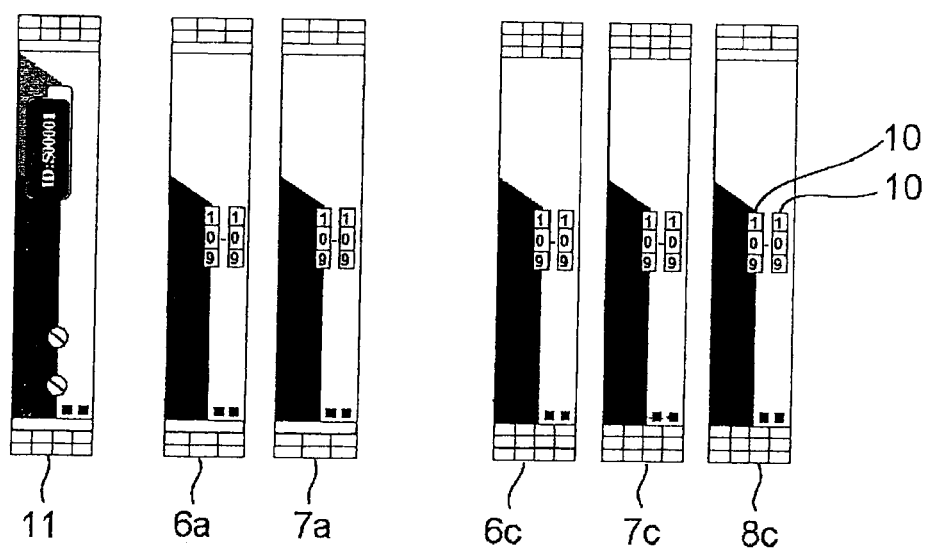
FIG. 4 illustrates a second embodiment of a first Client of the wireless network.

It shows:

FIG. 1 a schematic representation of the embodiment of the invented wireless network, FIG. 2 the wireless network shown in FIG. 1 with an exemplary assignment of different input units to output units of the various Clients of the wireless network, FIG. 3 a first embodiment of a first Client of the wireless network, and FIG. 4 a second embodiment of a first Client of the wireless network.

The same or corresponding components are provided in the figures with the same reference numbers.

The schematic representation in FIG. 1 shows an embodiment of the invented wireless network 1.

The wireless network 1 includes several first Clients 3a, 3b, 4a to 4d, 5 and second Client 2, which can communicate with each other by radio waves. Wireless network 1 is structured in the form of a tree structure, wherein second Client 2 is at the top of the tree structure, and first Clients 3a, 3b, 4a to 4d, 5 are connected to second Client 2. In this embodiment, second Client 2 is a Master-Client, located on the first network layer of wireless network 1, and first Clients 3a, 3b are Repeater-Slave-Clients which are located in a second network layer subordinate to the first, and in which first Clients 4a, 4d are Slave-Clients which are located in a third network layer subordinate to the second, and first Clients 4b, 4c are Repeater-Slave-Clients which are also located in the third network layer, and at the end first Client 5 is a Repeater-Slave-Client which is located in a fourth network layer subordinate to the third. Within wireless network 1, communications is possible between second Client 2 and first Client 3a, between second Client 2 and first Client 3b, between first client 3a and first Client 4a, between first Client 3a and first Client 4b, between first Client 3b and first Client 4c, between first Client 3b and first Client 4d, as well as between first Client 4b and first Client 5. First Clients 4a, 5, 4c, 4d are the endpoints of wireless network 1.

The structure of wireless network 1 is provided only as an example. For example, additional network layers and/or other Clients may be provided.

Wireless network 1 is set up so that it operates according to a polling method. Second Client 2 contacts first Clients 3a, 3b, 4a to 4d, 5, cycling one after the other in this embodiment, in order to communicate data between second Client 2 and the first Client being contacted. This type of contacting is known as "polling". Polling methods are well-known in the industry.

First Clients 3a, 3b, 4a to 4d, 5 and second Client 2 should have at least one input unit for entry of data and/or at least one output unit for the output of data, wherein a first reference is set to an input unit, and a second reference is set to an output unit, and wireless network 1 is arranged so that the incoming data from the input unit will be communicated to one or more output units, where the second reference matches with the first reference for the input unit.

This will be further described in FIG. 2.

Second Client 2 is comprised of radio unit 11 for transmitting and receiving radio waves, and output unit 7a.

Client 3a is comprised of radio unit 11, two output units 7 and input unit 6. First Client 3b is comprised of radio unit 11, input unit 6a and output unit 7a. First Client 4c is comprised of radio unit 11, input unit 6a and output unit 7a. Second Client 2 and first Clients 3a, 3b, 4c are modularly comprised of: radio unit 11, input units 6a and output units 7a. The modular design of the Clients makes it possible to provide the Clients with the required units for each Client without large overhead, in particular the required number of input units and/or output units. Furthermore, a later addition or replacement of units can be easily made.

Other first Clients 4a, 4b, 4d and 5 may, similar to first Clients 3a, 3b, 4c, have radio unit 11 and one or more input units 6a and/or output units 7a.

The second reference for output unit 7a of second Client 2 is set to "4". The first reference for input unit 6a of first Client 3 is set to "2", and the second reference of both output units 7a is set to "1" and "4". The first reference for input unit 6a of the first Client 3 is set to "1", and the second reference for output unit 7a is set to "2". The first reference for input unit 6a of first Client 4c is set to "4", and the second reference to for output unit 7a is set to "2".

Incoming data at input unit 6a of first Client 3b is communicated to the output unit of first Client 3a with the second reference set at "1". Incoming data at input unit 6a of first Client 3a is communicated to output units 7a of first Clients 3b, 4c.

Incoming data at input unit 6a of first Client 4c is communicated to output units 7a of first Client 3a and second Client 2 with the second reference set at "4".

Wireless network 1 is configured such that incoming data from input unit 6a of a first Client 3a, 4b, 4c is first communicated to the second Client 2. Subsequently the data from input unit 6a, which is assigned a matching first reference and second reference to one or more output units 7a, is communicated to one or more output units 7a, which are assigned by second Client 2 to it or to first Clients 3a, 4b, 4c associated with the data. Second Client 2 has data storage in which it stores the communicated data and from which it retrieves the data for communication to one or more output units 7a. Preferably second Client 2 communicates the data of input units 6a to assigned output units 7a of first Clients 3a, 4b, 4c only when it or first Clients 3a, 4b, 4c request the data, for example, because output units 7a need the data.

FIG. 3 shows an initial embodiment of a first Client which is used in wireless network 1.

The first Client is modular and is comprised of a head module 11 with integrated radio unit, a first input unit 6a, a first output unit 7a, a second input unit 6b, a second output unit 7b, a third input unit 6c, a second output unit 7c, and a combined input-output unit 8, wherein the units are each configured as a circular modules. First input unit 6a has four digital inputs, first output unit 7a has four digital outputs, second input unit 6b has eight digital inputs, second output unit 7b has eight digital outputs, third input unit 6c has four analog inputs, the third output unit 7 has four analog outputs, the combined input-output unit 8 has two digital inputs and two digital outputs and two analog inputs and two analog outputs.

To set an initial reference and/or a second reference, any input unit 6a, 6b, 6c, 8, and each output unit 7a, 7b, 7c, 8 has a manually adjustable address coding switch, herein as rotary coding switch 9. Each rotary coding switch 9 can be set to an integer ranging from 0 to 9. In this way, up to 100 discreet first references and second references can be set.

FIG. 4 shows a second embodiment of a first Client. In contrast to the first embodiment shown in FIG. 3 of a first Client, the first reference for input unit 6a, 6c, 8 and the second reference for output unit 7a, 7c, 8 are manually adjusted by means of two thumbwheels 10. Each thumbwheel is set to an integer ranging from 0 to 9. Accordingly, it is possible to set 100 different first references and second references.

Depending on the number of input and output units within the wireless network, one or more rotary coding switches 9 and/or thumbwheels 10 can be provided.

REFERENCE LIST

Wireless network 1
Second Client 2
First Client 3a, 3b, 4a, 4b, 4c, 4d, 5
Input unit 6a, 6b, 6c
Output unit 7a, 7b, 7c
Combined input-output unit 8
Rotary coding switch 9
Thumbwheel 10
Radio unit 11

The invention claimed is:

1. A wireless network comprising several first Clients that can communicate with each other using radio waves,
wherein the first Clients have at least one input unit for entry of data and at least one output unit for output of data, and a first reference is set to an input unit, and
a second reference is set to an output unit, wherein the first reference and the second reference are manually adjustable at the input unit and the output unit, respectively,
wherein individual reference values are assigned to each corresponding input unit and/or output unit associated with first Clients having plural input units and/or plural output units;
wherein the wireless network is arranged such that data locally provided at the input unit is communicated to one or several output units, whose second reference matches the first reference set for the input unit,
wherein, when data exchange between the input units and the output units is under control of the first Clients, the wireless network is configured to exchange data directly without a master controller as a function of programming the manually adjustable references, the programming comprising manually setting the first reference to an input unit and manually setting the second reference to an output unit.

2. The wireless network according to claim 1 further comprising a second Client, wherein wireless network is set up so that incoming data from input unit of first Client is communicated to the second Client, and data from input unit, which are assigned a matching first reference and second reference to one or more output units, is communicated from the second Client to one or more of its assigned output units.

3. The wireless network according to claim 2 further comprising a second Client that has a data storage device, in which it stores the data and from which it retrieves the data to communicate to one or more output units.

4. The wireless network according to claim 2 wherein the network is set up such that the second Client contacts the first Clients in succession to communicate data between second Client and the contacted first Clients.

5. The wireless network according to claim 4, wherein the network is set up such that the second Client contacts the first Clients cyclically.

6. The wireless network according to claim 2 comprising a first Client and a Repeater-Slave-Client and/or Slave-Client, and wherein the second Client is a Master-Client.

7. The wireless network according to claim 1 wherein the wireless network is set up such that the wireless network works using a polling method.

8. The wireless network according to claim 1 wherein the wireless network is structured as a tree structure.

9. The wireless network according to claim 1 wherein the first reference for input unit and/or the second reference for output unit are manually adjustable.

10. The wireless network according to claim 9 wherein the first reference for input unit and/or the second reference for output unit are manually adjustable using one or more address coding switches.

11. The wireless network according to claim 10 wherein the first reference for input unit and/or the second reference for output unit are manually adjustable using one or more rotary coding switches or thumbwheels.

12. The wireless network according to claim 1 wherein the first Clients are comprised of a radio unit.

13. The wireless network according to claim 1 wherein the first Clients and the second Client are comprised of a radio unit.

14. The wireless network according to claim 1 wherein the first Clients are modular, wherein the at least one input unit is an input device, and the at least one output unit is an output device.

15. The wireless network according to claim 14 wherein the radio unit is a wireless device.

16. The wireless network according to claim 1 wherein the first Clients and the second Client are modular, wherein input unit is an input device, and the output unit is an output device.

17. The wireless network according to claim 16 wherein the radio unit is a wireless device.

* * * * *